United States Patent
Li et al.

(10) Patent No.: US 12,469,604 B2
(45) Date of Patent: Nov. 11, 2025

(54) COMPUTER VISION MONITORING AND PREDICTION OF AILMENTS

(71) Applicant: KETCHUP ON, INC., New York, NY (US)

(72) Inventors: Kevin Li, New York, NY (US); Anthony Ko-Ping Chien, Foster City, CA (US)

(*) Notice: Subject to any disclaimer, the term of this patent is extended or adjusted under 35 U.S.C. 154(b) by 325 days.

(21) Appl. No.: 17/268,485

(22) PCT Filed: Aug. 15, 2019

(86) PCT No.: PCT/US2019/046590
§ 371 (c)(1),
(2) Date: May 13, 2021

(87) PCT Pub. No.: WO2020/076416
PCT Pub. Date: Apr. 16, 2020

(65) Prior Publication Data
US 2024/0428944 A1    Dec. 26, 2024

Related U.S. Application Data

(60) Provisional application No. 62/764,916, filed on Aug. 16, 2018.

(51) Int. Cl.
*G16H 50/30* (2018.01)
*A61B 5/11* (2006.01)
(Continued)

(52) U.S. Cl.
CPC .............. *G16H 50/30* (2018.01); *A61B 5/112* (2013.01); *G16H 40/67* (2018.01); *H04W 4/14* (2013.01); *A61B 2503/40* (2013.01)

(58) Field of Classification Search
CPC ........ G16H 50/30; G16H 40/67; G16H 50/20; G16H 50/50; G16H 50/70; G16H 10/60;
(Continued)

(56) References Cited

U.S. PATENT DOCUMENTS 5,441,047 A * 8/1995 David ................. A61B 5/6887
348/93
6,899,686 B2   5/2005 Hampton et al.
(Continued)

FOREIGN PATENT DOCUMENTS

DE   102012016600   2/2014
GB       2407725    3/2003
JP     2015033059   2/2015

OTHER PUBLICATIONS

Preeti Khera & Neelesh Kumar (2020) Role of machine learning in gait analysis: a review, Journal of Medical Engineering & Technology, 44:8, 441-467, DOI: 10.1080/03091902.2020.1822940. Published online: Oct. 20, 2020. (Year: 2020).*
(Continued)

*Primary Examiner* — Christopher L Gilligan
*Assistant Examiner* — Tristan Isaac Evans
(74) *Attorney, Agent, or Firm* — Law Office of Scott P. Zimmerman, PLLC

(57) ABSTRACT

A mobile or stationary device generates video data of a human's or an animal's movements. The device may then perform a vision analysis to predict an ailment, based on the video data. The video data may be compared to historical data to determine a difference in the human's or the animal's movements. If the difference is within a threshold value, then the vision analysis may infer that the human or animal is moving as expected. However, if the difference lies outside a normal range, or exceeds the threshold value, then the vision analysis may infer that the human or animal suffers from the ailment. Different ranges of values and thresholds may thus be established to infer different ailments. For example, gait and posture may be monitored over time to infer the early onset of arthritis and diabetes.

17 Claims, 14 Drawing Sheets

(51) Int. Cl.
*G16H 40/67* (2018.01)
*H04W 4/14* (2009.01)

(58) Field of Classification Search
CPC ..... G16H 30/40; A61B 5/112; A61B 2503/40; H04W 4/14
See application file for complete search history.

(56) References Cited

U.S. PATENT DOCUMENTS

| | | | |
|---|---|---|---|
| 7,209,588 B2 | 4/2007 | Liang et al. | |
| 8,514,236 B2 | 8/2013 | Kobla et al. | |
| 8,790,279 B2 | 7/2014 | Brunner | |
| 8,897,512 B1* | 11/2014 | Bozinovic | G06V 20/46 |
| | | | 382/103 |
| 8,928,734 B2 | 1/2015 | Dai et al. | |
| 9,692,949 B2 | 6/2017 | Hollinger | |
| 9,737,049 B2 | 8/2017 | Trottier et al. | |
| 10,025,973 B2 | 7/2018 | Datta et al. | |
| 11,089,977 B2* | 8/2021 | Terashima | A61B 5/00 |
| 2005/0144039 A1* | 6/2005 | Tamblyn | G16H 20/10 |
| | | | 705/2 |
| 2016/0119541 A1 | 4/2016 | Alvarado-Moya et al. | |
| 2016/0249038 A1 | 8/2016 | Mosleh et al. | |
| 2017/0000081 A1 | 1/2017 | Betts-Lacroix et al. | |
| 2017/0112418 A1 | 4/2017 | Comeau et al. | |
| 2017/0202185 A1 | 7/2017 | Trumbull et al. | |
| 2021/0046356 A1* | 2/2021 | Czaja | G09B 5/02 |

OTHER PUBLICATIONS

Shakhnarovich, Viola and Darrell, "Fast pose estimation with parameter-sensitive hashing," Proceedings Ninth IEEE International Conference on Computer Vision, Nice, France, 2003, pp. 750-757 vol. 2, doi: 10.1109/ICCV.2003.1238424. (Year: 2003).*

Ortells, Javier. Vision-based gait impairment analysis for aided diagnosis. Medical and Biological Engineering and Computer (2018) 56: 1553-1564. Feb. 12, 2018. (Year: 2018).*

Crawford, Jae, "PlayDate: World's First Pet Camera in a Smart Ball", Jan. 10, 2017.

"A Smart Ball Aims To Entertain Your Pets".

* cited by examiner

COMPUTER VISION MONITORING AND PREDICTION OF AILMENTS

35 U.S.C. § 365 RIGHT OF PRIORITY

This national stage patent application claims a right of priority under 35 U.S.C. § 365 to International Application No. PCT/US2019/046590 filed Aug. 15, 2019, which claims priority to U.S. Provisional Application No. 62/764,916 filed Aug. 16, 2018 and incorporated herein by reference in its entirety.

CROSS-REFERENCE TO RELATED APPLICATIONS

This patent application also relates to U.S. Provisional Application No. 62/297,967 filed Feb. 22, 2016 and to U.S. Provisional Application No. 62/309,487 filed Mar. 17, 2016, with both provisional applications incorporated herein by reference in their entireties. This application also relates to International Application No. PCT/US2017/017599 filed Feb. 13, 2017, published as WO 2017/146924 A1, and also incorporated herein by reference in its entirety.

BACKGROUND

Ailments in people and pets are sometimes detected too late for successful treatment. For example, humans often only detect arthritis at joint pain. Diabetes is usually only detected after testing. Arthritis and diabetes are only detected in dogs, cats, horses, and other animals when physical movement is degraded. However, visual and diagnostic detection is often too late to ensure recovery.

BRIEF DESCRIPTION OF THE SEVERAL VIEWS OF THE DRAWINGS

The features, aspects, and advantages of the exemplary embodiments are understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
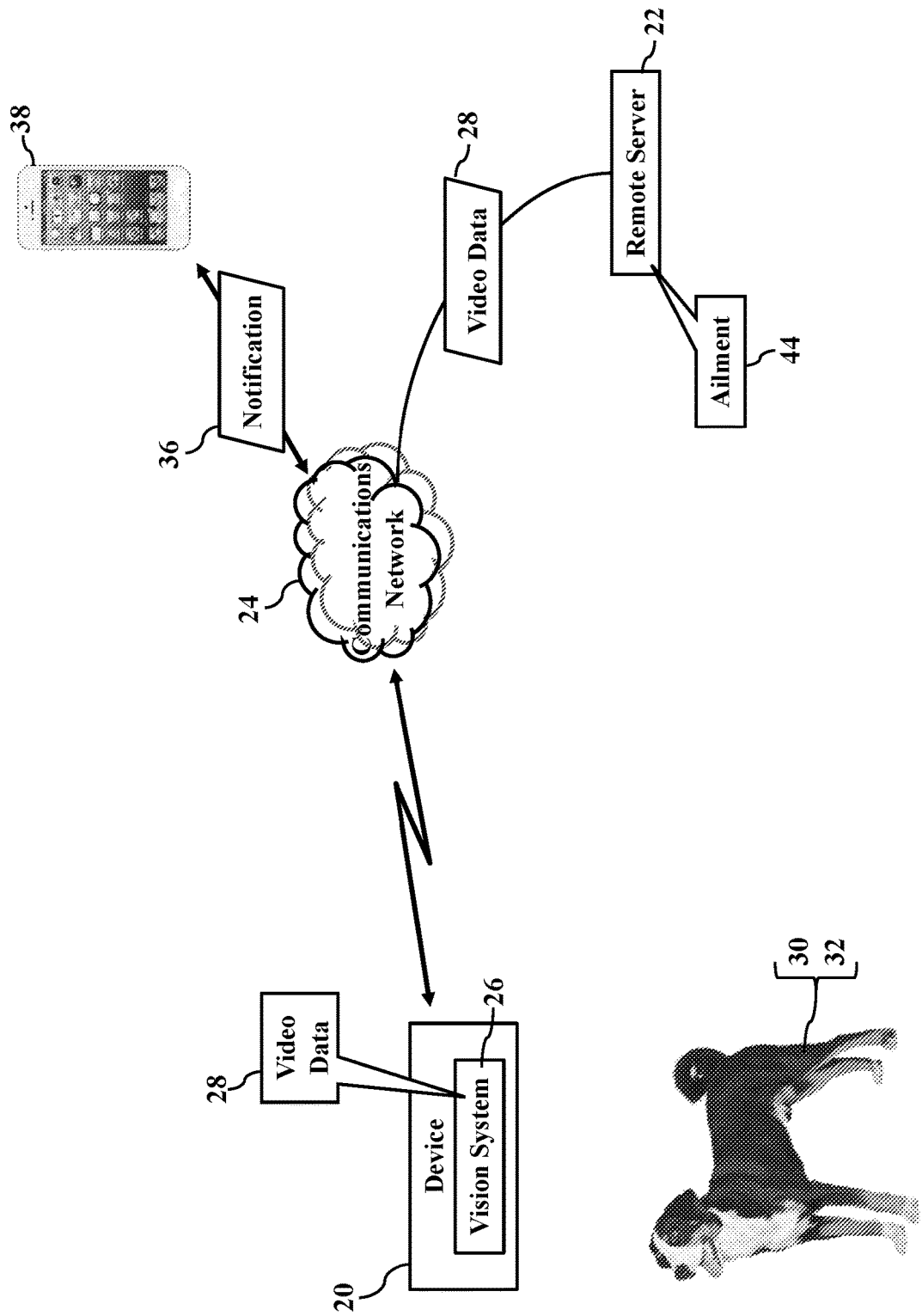
FIG. 1 is a simplified illustration of an operating environment, according to exemplary embodiments.

FIG. 1 is a simplified illustration of an operating environment, according to exemplary embodiments. A device 20 communicates with a remote server 22 via a communications network 24. The device 20 has a vision system 26 (such as a digital camera) that captures live, real-time video data 28 of a subject 30. For simplicity, the subject 30 is illustrated as a pet dog 32, but the subject may be any human, plant, or thing. Regardless, the device 20 wirelessly or wiredly sends or uploads the real-time video data 28 to the remote server 22 via a network interface to the communications network 24. When the remote server 22 receives the real-time video data 28, the remote server 22 analyzes the video data 28 to predict an ailment 34 in the dog 32. That is, the remote server 22 uses computer vision to monitor the physical movements of the dog 32 to predict arthritis, diabetes, and other ailments 34. Should the remote server 22 predict the ailment 34, the remote server 22 may then send an electronic notification 36 via the communications network 24 to any destination (such as an email and/or short message service text message to a smartphone 38). The electronic notification 36 notifies of the ailment 34, perhaps based on the real-time video data 28 captured by the vision system 26. A user of the smartphone 38 (such as an owner of the pet dog 32) may then arrange medical care.

Figure 2:
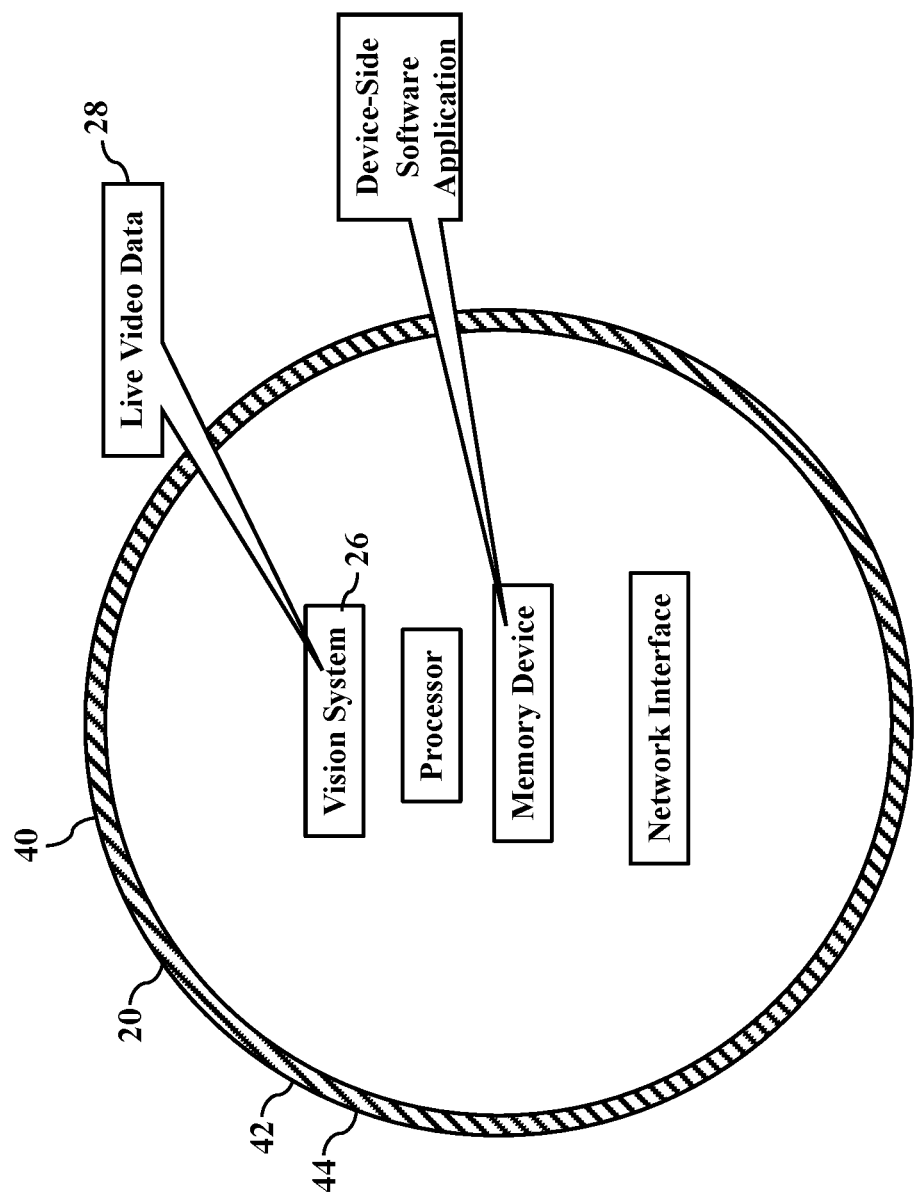
FIGS. 2-3 illustrate a device having vision capabilities, according to exemplary embodiments.
Figure 3:
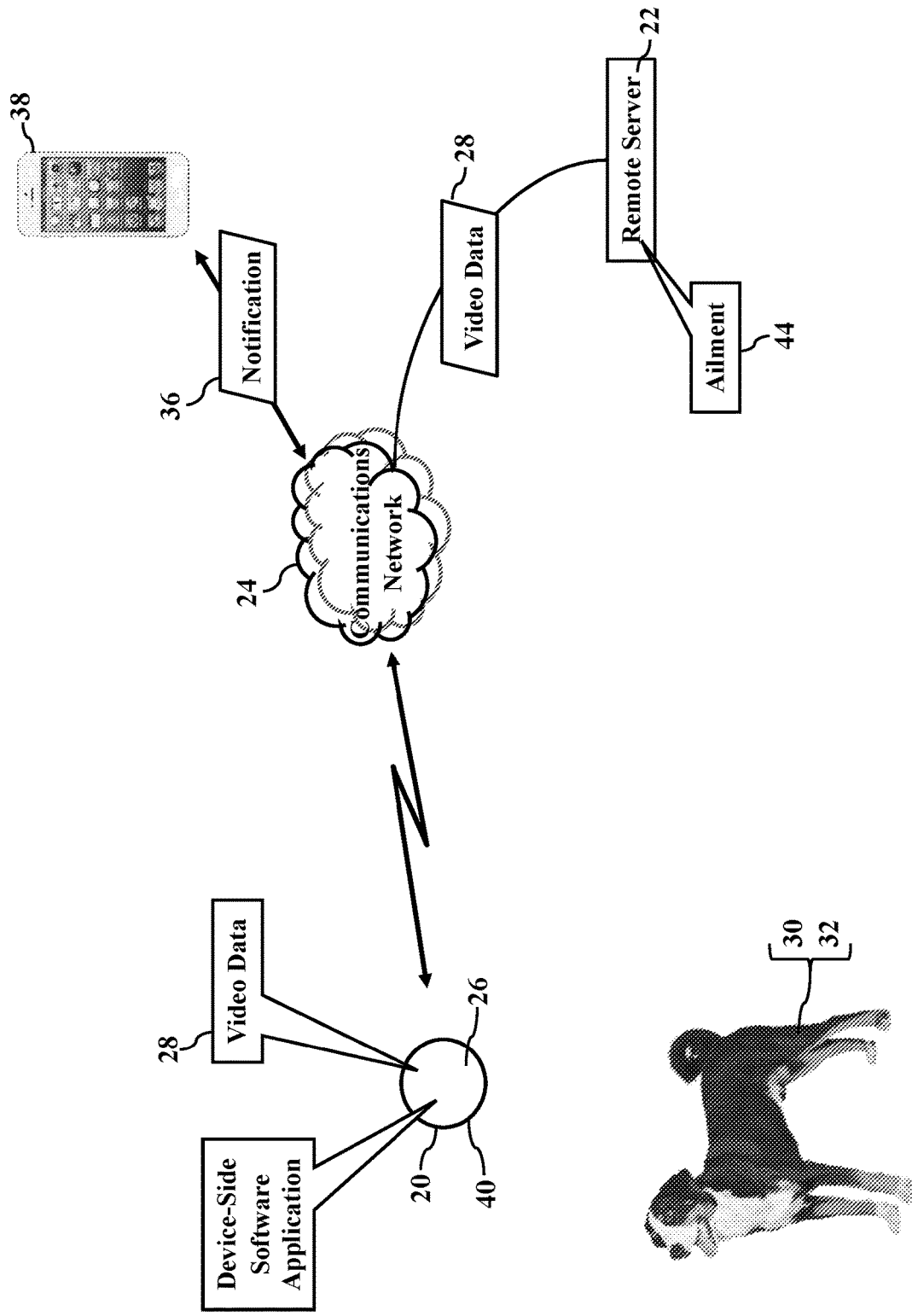

FIGS. 2-3 further illustrate the device 20, according to exemplary embodiments. While the device 20 may be any stationary or mobile processor-controlled apparatus, FIG. 2 illustrates a spherical ball 40. That is, the device 20 has an external housing 42 (such as a spherical outer shell 44) and internal componentry (such as a hardware processor, a memory device, the network interface, and the vision system 26). The hardware processor executes a device-side software application stored in the memory device 20. The device-side software application causes the hardware processor to perform operations, such as instructing the vision system 26 to generate the real-time video data 28. For example, if the external housing 42 is constructed or molded of a clear, transparent, and/or translucent material, the vision system 26 captures a clear frontal/rearward/skyward view as the ball 40 rolls. So, as FIG. 3 illustrates, the dog 32 plays with the spherical ball 40, and the vision system 26 captures the live, real-time video data 28 of the dog 32. The device 20 sends the real-time video data 28 to the remote server 22 for a vision analysis. If the remote server 22 predicts the ailment 34 in the dog 32, the remote server 22 may then send the electronic notification 36 to the owner's smartphone 38.

Figure 4:
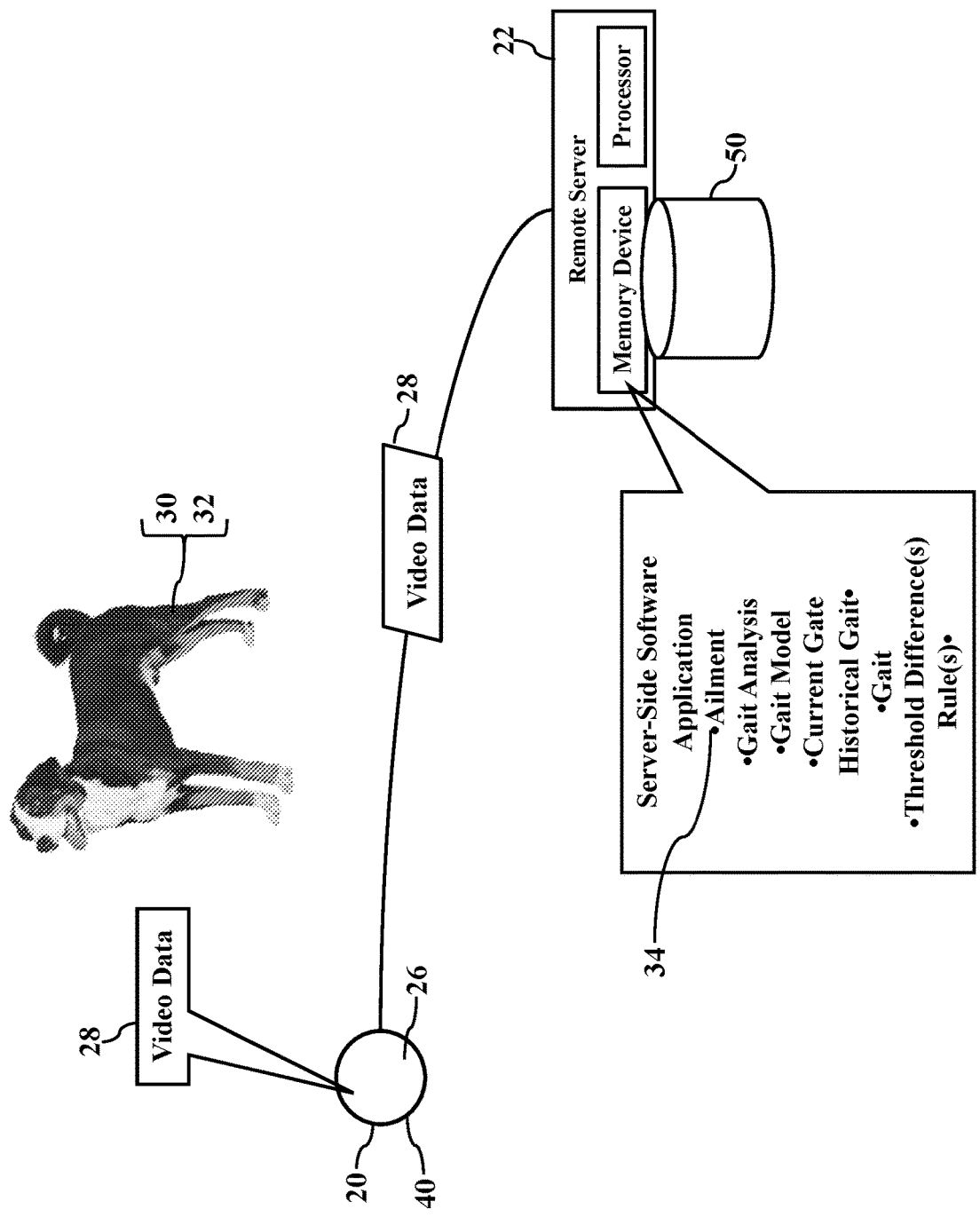
FIG. 4 illustrates a gait analysis, according to exemplary embodiments.

FIG. 4 illustrates a gait analysis, according to exemplary embodiments. Here exemplary embodiments may predict the ailment 34 in the dog 32, based on the gait analysis of the dog walking, running, and other movements. The remote server 22 has a hardware processor that executes a server-side software application stored in a solid-state memory device. The server-side software application causes the hardware processor to perform operations, such as executing the gait analysis. As the remote server 22 receives the real-time video data 28 of the dog 32, the remote server 22 may inspect the real-time video data 28 and generate a gait model. The gait model represents any data points or information within the real-time video data 28 that represent the dog's current or contemporary gait. The remote server 22 may then compare the current data points to historical data points or information stored within, or referenced by, an electronic database 50. The electronic database 50 stores or maintains historical or past data points (historically observed within past video data 28 uploaded by the device 20) that represent the dog's past or historical gait. If the dog's current gait differs from its historical gait (perhaps according to one or more threshold differences), then the remote server 22 may infer that the dog 32 suffers from the ailment 34.

Exemplary embodiments may implement one or more logical rules. Each logical rule may be expressed to help detect, or infer, a different ailment 34. For example, one of the threshold differences may be associated with arthritis. If the dog's current gait differs from its historical gait according to an arthritic threshold difference, then exemplary embodiments may infer that the dog 32 suffers from arthritis. Another one of the threshold differences may be associated with diabetes. If the dog's current gait differs from its historical gait according to a diabetic threshold difference, then exemplary embodiments may infer that the dog 32 suffers from diabetes. The threshold differences, of course, may be chosen or configured to represent any ailment 34 that is vision-detectable based on the dog's gait.

Exemplary embodiments may thus use computer vision to detect changes in the dog's walk over time. The device 20 may vision record the dog's walk/run, perhaps throughout a day (or any time period, as configured). Small changes in the dog's gait may indicate arthritis, but the small changes are likely imperceptible to the human eye and manifest themselves too late for intervention. Exemplary embodiments, instead, may be configured to detect the small changes (based on a small value of the threshold difference) and predict the ailment 34.

Figure 5:
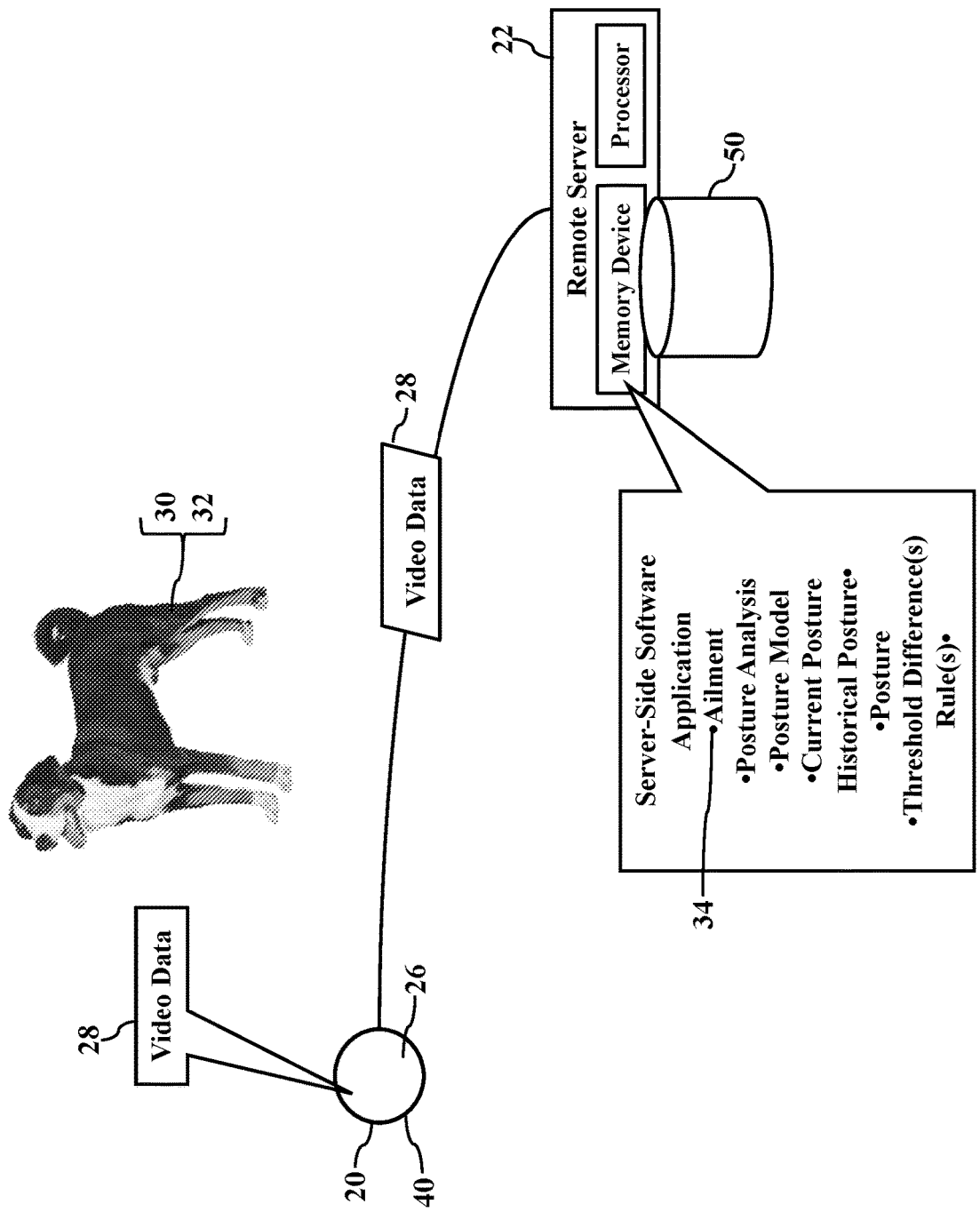
FIG. 5 illustrates a posture analysis, according to exemplary embodiments.
Figure 6:
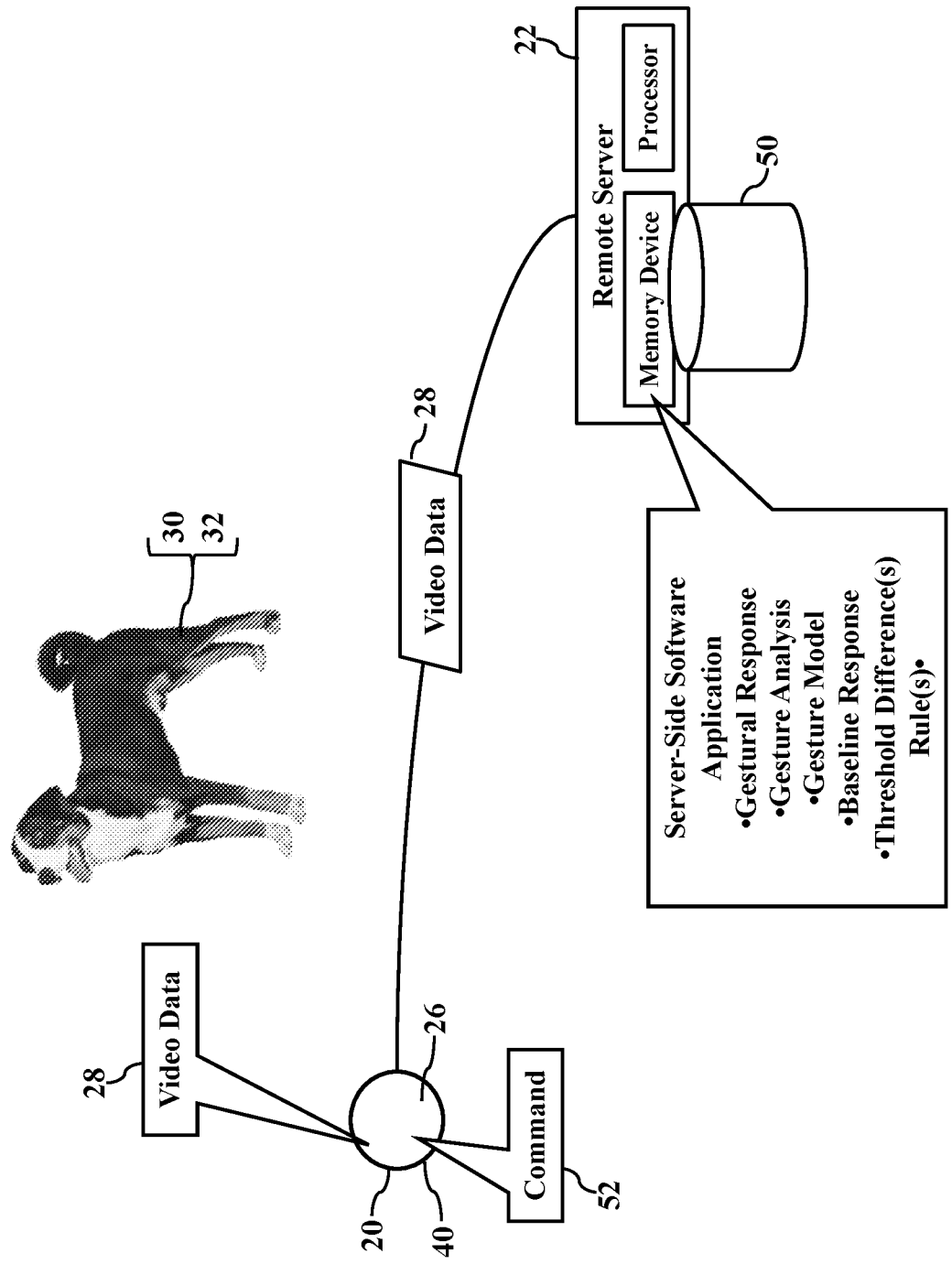
FIGS. 6-9 illustrate an automated trainer, according to exemplary embodiments.

FIG. 5 illustrates a posture analysis, according to exemplary embodiments. Here exemplary embodiments may predict the ailment 34 in the dog 32, based on the posture analysis of the dog's posture. As the remote server 22 receives the real-time video data 28 of the dog 32, the server-side software application instructs the remote server 22 to inspect the real-time video data 28 and to generate a posture model. The posture model represents the current data points or information within the real-time video data 28 that represent the dog's current posture. The remote server 22 may then compare the current points or information to the historical data points or information in the electronic database 50 that represent the dog's past or historical posture. If the dog's current posture differs from its historical posture (perhaps according to the one or more threshold differences), then the remote server 22 may infer that the dog 32 suffers from the ailment 34 related to its posture. Again, then, exemplary embodiments may implement the one or more logical rules that represent the different ailments 34 that are machine observable from the dog's posture.

FIGS. 6-9 illustrate an automated trainer, according to exemplary embodiments. Here the device 20 (again illustrated as the ball 40) may be programmed or configured to audibly reproduce one or more commands 52. That is, the device 20 may have a speaker, audio player, or audio system that outputs the audible command 52. When the device 20 reproduces the audible command 52, the dog 32 may be trained to perform a corresponding movement or other gestural response. As a simple example, assume that the spherical ball 40 generates or speaks "sit!" as the audible command 52. The spherical ball 40 may nearly simultaneously activate the vision system 26 to generate the real-time video data 28 representing the dog's gestural response (such as a sitting position). The device 20 sends the video data 28 to the remote server 22 for a gesture analysis. That is, exemplary embodiments instruct the remote server 22 to inspect the real-time video data 28 and to generate a gesture model. The gesture model represents the current data points or information within the real-time video data 28 that represent the dog's gestural response. The server-side software application may also instruct the remote server 22 to compare the current data points or information to the data points or information in the electronic database 50 that represent a correct or baseline gestural response. Simply put, if the dog's gestural response matches the expected baseline gestural response, then the server-side software application may infer that the dog 32 correctly understood the audible command 52 and/or correctly performed the corresponding gesture (i.e., the sitting position). However, if the dog's current gestural response fails to match the baseline gestural response (perhaps outside the threshold difference), exemplary embodiments may infer that the dog 32 incorrectly understood the audible command 52 and/or incorrectly performed the corresponding gesture (i.e., the sitting position). The server-side software application may instruct the remote server 22 to inform the owner of the dog's failure.

Figure 7:
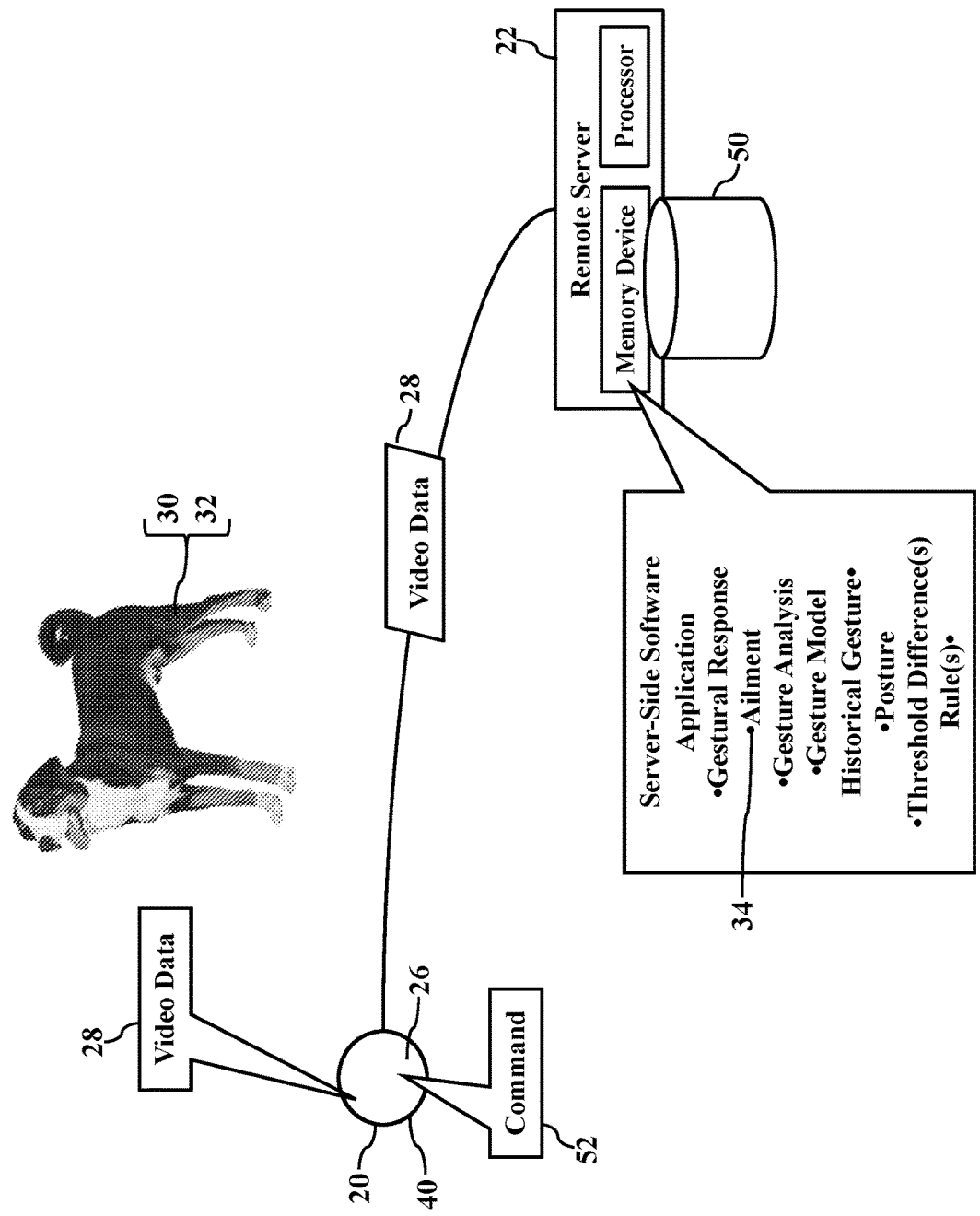

FIG. 7 illustrates ailment detection. Here the dog's gestural response may indicate the ailment 34. When the remote server 22 receives the real-time video data 28 of the dog 32 performing the gestural response to the audible command 52, the server-side software application may also instruct the remote server 22 to determine arthritis, diabetes, or other ailment 34. That is, the gesture model representing the dog's gestural response (i.e., the sitting position) may be compared to the entries in the electronic database 50. If the dog's current gestural response differs from its historical gestural response (perhaps according to the one or more threshold differences), then exemplary embodiments may infer that the dog 32 suffers from the ailment 34 related to its gestural response. Again, then, exemplary embodiments may implement the one or more logical rules that represent the different ailments 34 that are machine observable from the dog's gestural response.

Figure 8:
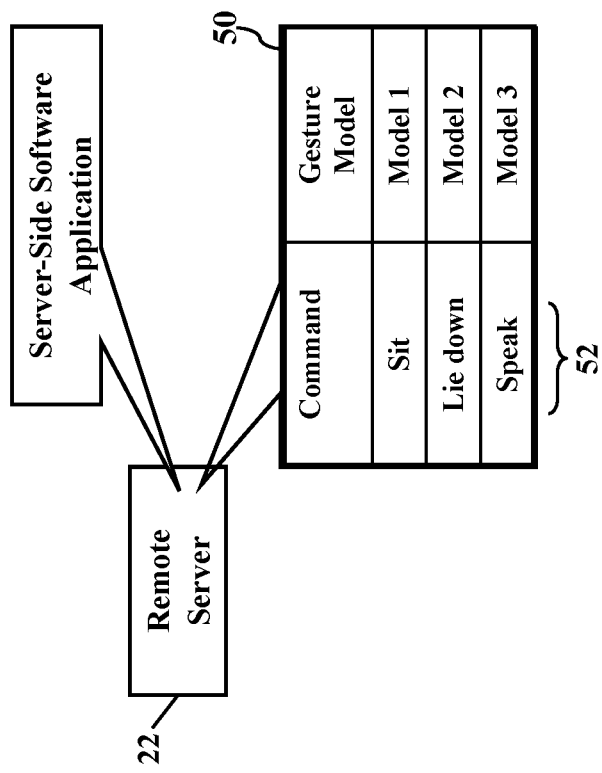

FIG. 8 further illustrates the electronic database 50. While the electronic database 50 may have any structure or implementation, a relational table is perhaps easiest to understand. The electronic database 50 may have entries that map, relate, or associate different audible commands 52 to their corresponding gesture model. The electronic database 50, for example, associates the audible command 52 "sit!" to its corresponding gesture model for the sitting position. Another entry maps the audible command 52 "lie down!" to its corresponding gesture model for the lying position. The audible command 52 "speak!" similarly maps to its corresponding gesture model for the speaking position. While FIG. 8 only illustrates a few examples, in actual practice the electronic database 50 may have many entries for many different audible commands 52 and their many different gesture models. Each gestural model contains or specifies video data, image vectors, static data points, or any other information that can be derived from video analysis.

Figure 9:
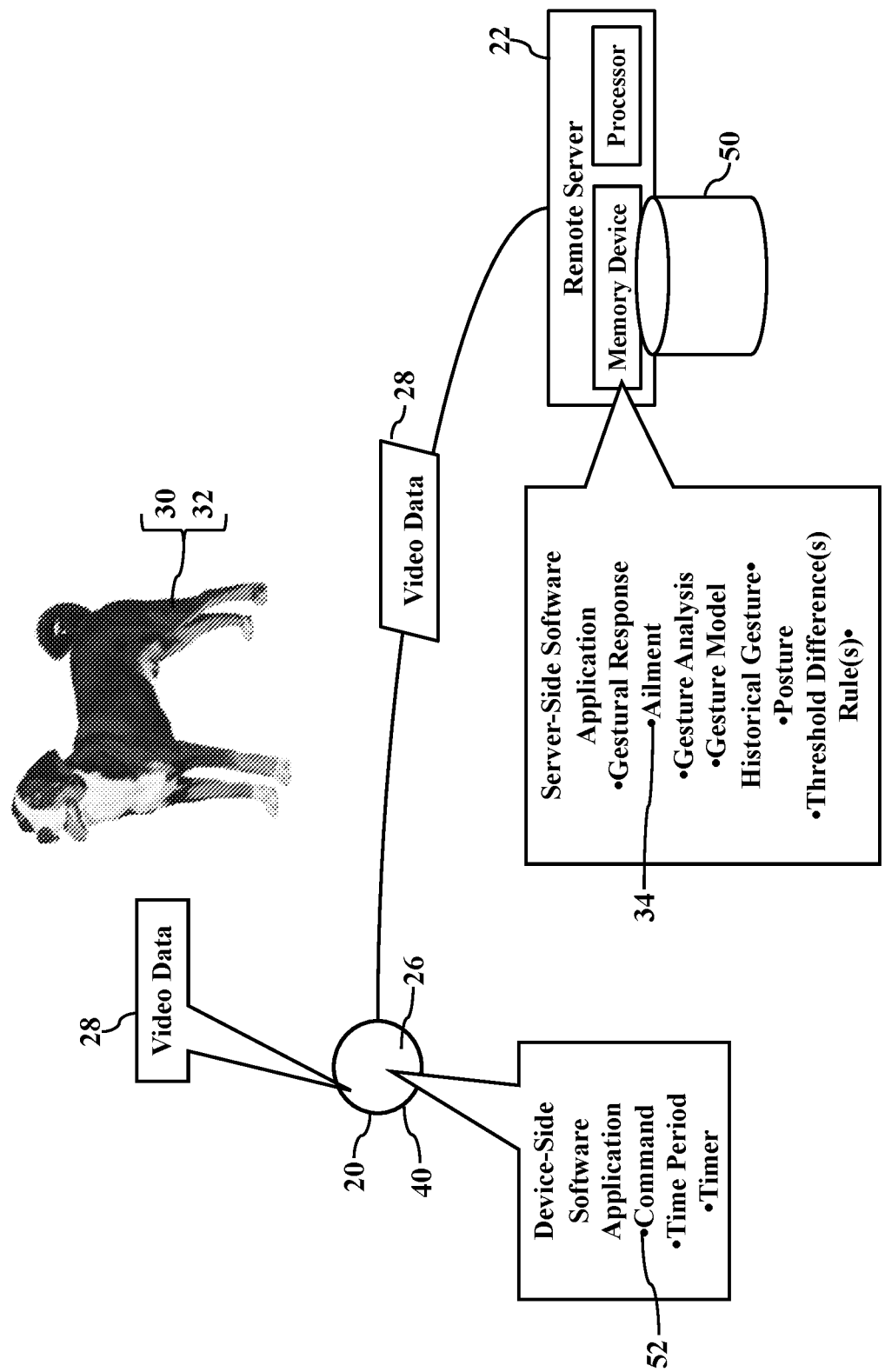

FIG. 9 further illustrates the audible commands 52. As the reader may understand, the dog 32 likely needs repetition to successfully train. The device 20 (again illustrated as the ball 40) may thus be configured to repetitively repeat the audible command 52 according to a time period (perhaps determined by a timer). Again, as a simple example, suppose the device-side software application is programmed to reproduce the audible command 52 "sit!" every fifteen (15) minutes. The device 20 may nearly simultaneously activate the vision system 26 to generate the real-time video data 28 representing the dog's gestural response and send the video data 28 to the remote server 22 for the gesture analysis (as earlier explained). Indeed, the device-side software application may be programmed to reproduce many different audible commands 52 (perhaps at different random or periodic times) and record/upload the dog's different gestural responses. Exemplary embodiments may thus repetitively train the dog 32 with less human interaction and with faster regimens.

The owner may also order the audible commands 52. The owner's smartphone 38 (illustrated in FIG. 3), as an example, may send a message to the device 20 via the communications network 24. The message may be generated by a mobile application stored in the memory device of, and executed by the hardware processor, operating within the smartphone 38. As the reader likely understands, the smartphone 38 may download and store the mobile application for interfacing with the device 20. Whenever the owner wants the dog 32 to perform a gesture (such as the sitting position), the owner may make an input to the smartphone (such as a capacitive or tactile entry) that causes the mobile application to generate the message. The message is sent from the smartphone 38 to the network address (e.g., Internet Protocol address) associated with or assigned to the ball 40. The message specifies the audible command 52 (such as the "sit!" command) selected by the owner. When the device 20 receives the message, the device-side software application causes the ball 40 to generate and/or audibly reproduce the corresponding audible command 52 ("sit!"). Moreover, the device-side software application causes the ball 40 to record the dog's gestural response and send the video data 28 to the remote server 22 for the gesture analysis (as earlier explained).

The owner may also receive the video data 28. The device-side software application and/or the server-side software application may be configured or programmed to send, share, or report the video data 28 to the owner's smartphone 38 or other destination. The owner may thus in nearly real time watch the dog 32 respond to the audible command 52. Whenever the ball 40 generates the video data 28, the ball 40 may be programmed or commanded to send the video data 28 to the IP address associated with the smartphone 38. The smartphone 38 may thus process the video data 28 for display, thus providing the owner/user with a nearly real time view of the dog's movements.

Figure 10:
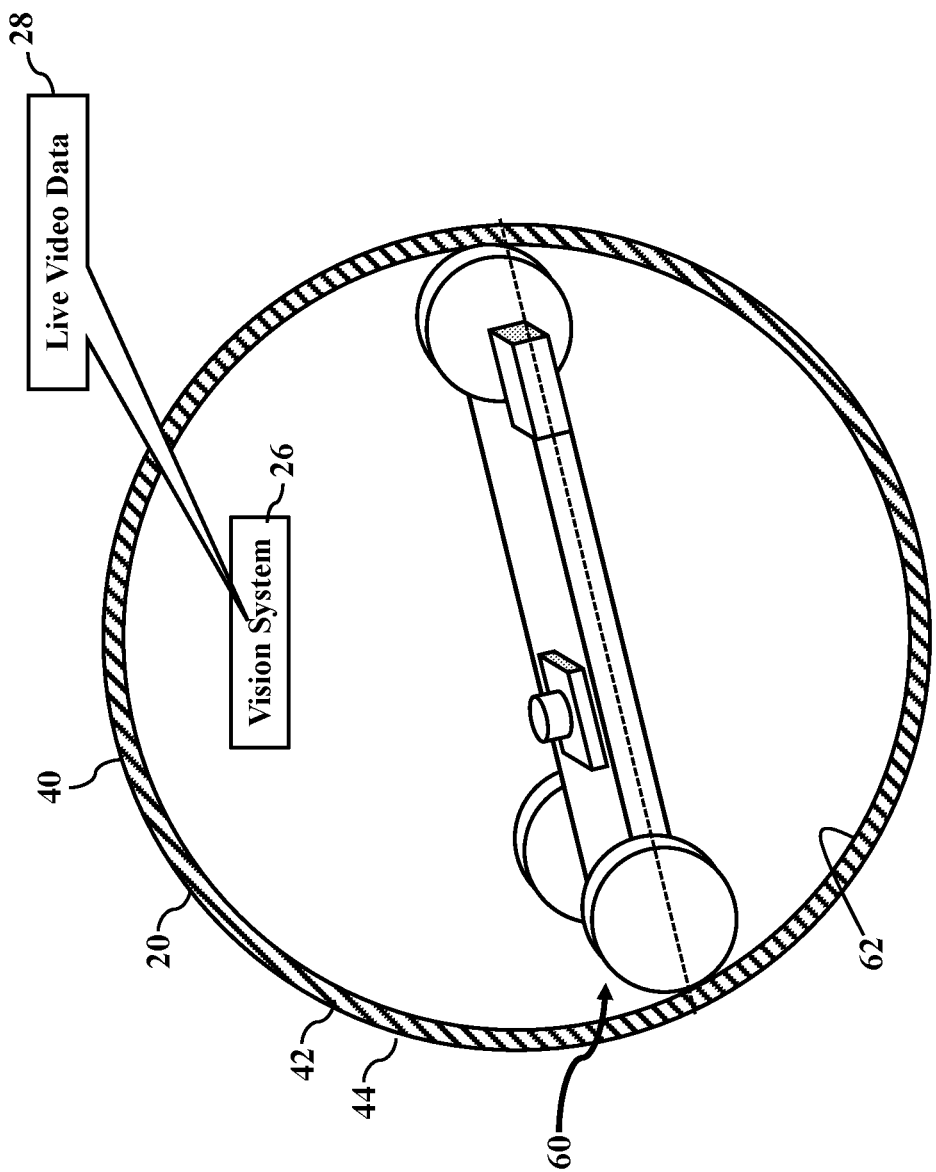
FIG. 10 further illustrates the device, according to exemplary embodiments.

FIG. 10 further illustrates the device 20, according to exemplary embodiments. Here the device 20 may optionally include a drive system 60. The drive system 60 allows the device 20 (illustrated as the spherical ball 40) to autonomously roll along the floor. The drive system 60, for example, may engage an interior side/surface 62 of the spherical ball 40, thus causing the spherical outer shell 44 to roll or to move. Outputs generated by other sensors may be used to determine the speed, the direction, an orientation, and other parameters (e.g., yaw, pitch, and/or roll). So, as the device 20 rolls along, the vision system 26 captures the live video data 28 for upload to any destination (such as the remote server 22 and/or the owner's mobile smartphone 38). Regardless, the owner may thus watch the live video data 28, issue the audible command(s) 52, and even change the rolling speed and/or direction, thus maneuvering the device 20 via the drive system 60. More details of the drive system 60 are explained by U.S. Provisional Application No. 62/297,967 filed Feb. 22, 2016, by U.S. Provisional Application No. 62/309,487 filed Mar. 17, 2016, and by International Application No. PCT/US2017/017599 filed Feb. 13, 2017, published as WO 2017/146924 A1, all of which are incorporated herein by reference in their entireties.

Exemplary embodiments may thus provide cloud-based services. The remote server 22 may provide video processing, analysis, and/or monitoring services to clients (such as the device 20). The cloud-based services may include nearly real-time video analysis, historical video analysis, and/or prediction of the ailment(s) 34 in exchange for compensation (e.g., a fee, service charge, or cryptocurrency). The remote server 22 may receive Internet/online requests for the cloud-based services, perform the cloud-based services, and send service responses or results back to the requesting client.

Figure 11:
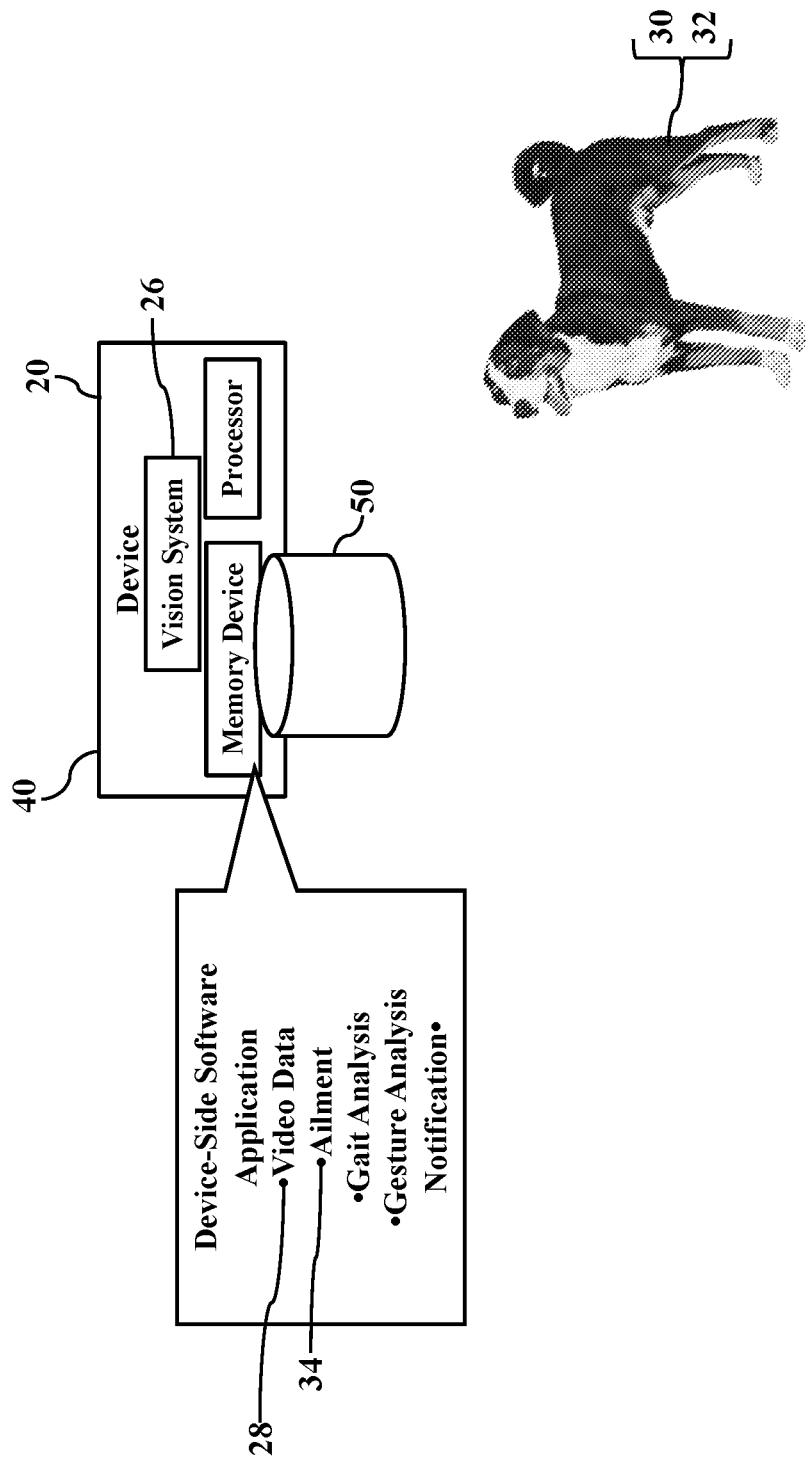
FIG. 11 illustrates a local solution, according to exemplary embodiments.

FIG. 11 illustrates a local solution, according to exemplary embodiments. Here the device 20 may itself predict the ailment 34. For example, whenever the device-side software application instructs the vision system 26 to generate the real-time video data 28, the device-side software application may also call other software programs or modules to analyze the real-time video data 28, generate the gait analysis and/or the posture analysis, and predict the ailment 34. Moreover, if the electronic database 50 is also locally stored, the device-side software application may query the electronic database 50 for historical or past entries, perhaps logged at a similar time of day and/or a similar GPS location. For example, as the dog 32 plays with the spherical ball 40, exemplary embodiments may maintain a historical repository of the dog's movements, determine changes over time, and generate the electronic notification 36 of the ailment 34. The device 20 may thus be configured to locally store the one or more logical rules to infer different ailments 34 over time.

Figure 12:
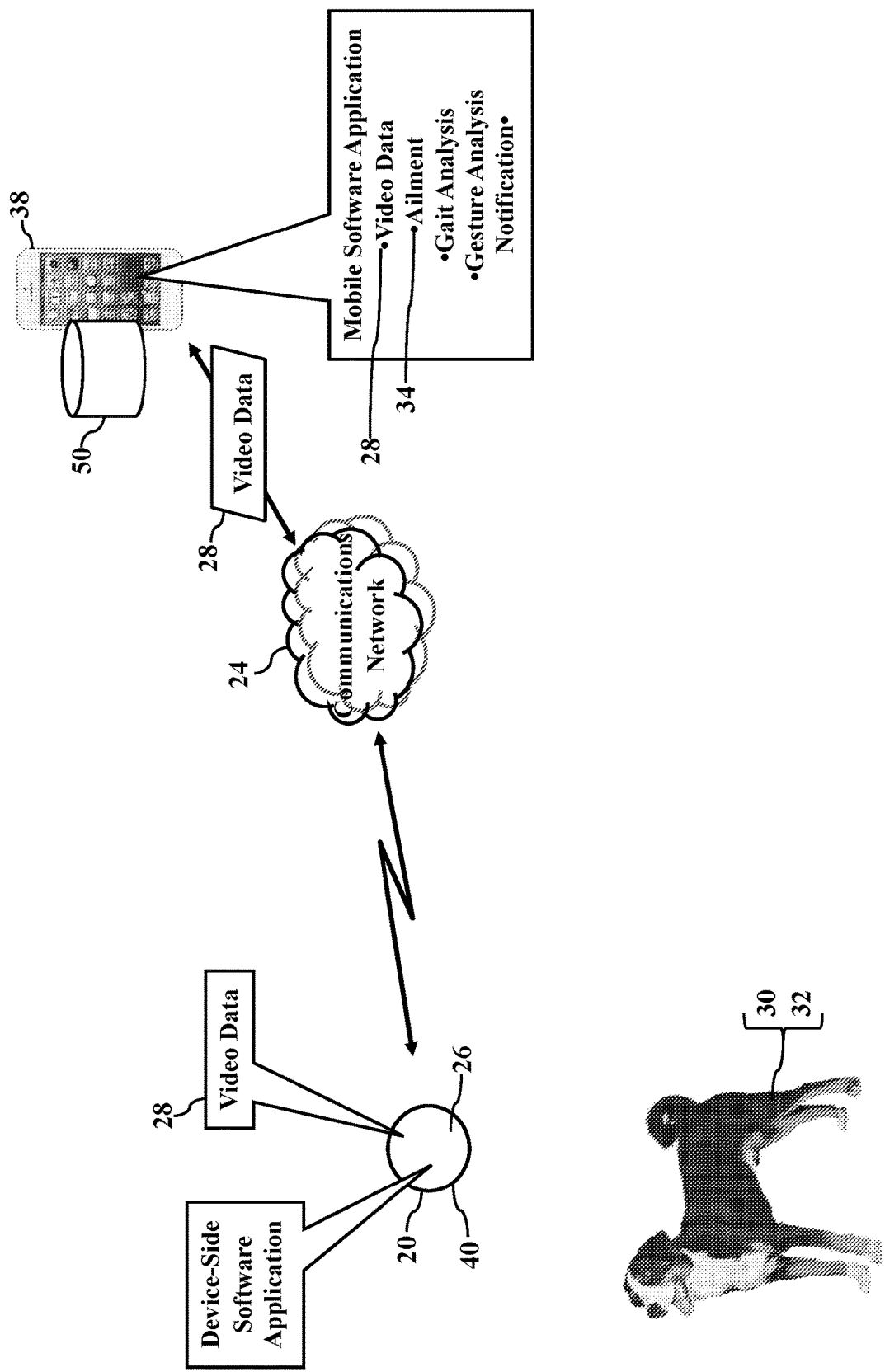
FIG. 12 illustrates a mobile solution, according to exemplary embodiments.

FIG. 12 illustrates a mobile solution, according to exemplary embodiments. Here the mobile smartphone 38 may predict the ailment 34. For example, whenever the device-side software application instructs the vision system 26 to generate the real-time video data 28, the device-side software application may then send or upload the real-time video data 28 to the mobile smartphone 38. The mobile smartphone 38 has a hardware processor that executes a mobile software application stored in a solid-state memory device. The mobile software application may analyze the real-time video data 28, generate the gait analysis and/or the posture analysis, and predict the ailment 34. Moreover, if the electronic database 50 is also locally stored, the mobile software application may query the electronic database 50 for historical or past entries, perhaps logged at a similar time of day and/or a similar GPS location. The mobile smartphone 38 may thus store and/or access a historical repository of the dog's movements, determine changes, and generate the electronic notification 36 of the ailment 34. The mobile smartphone 38 may thus be configured to locally store the one or more logical rules to infer different ailments 34 over time.

Exemplary embodiments may perform vision analysis for posture and gait analysis. When the device 20 includes the drive system 60, the ball 40 can move around, follow the dog 32, and collect data (such as the real-time video data 28). Because ball 40 may record throughout day, the ball 40 can detect early onset of arthritis, diabetes, and other ailments 34 much sooner than conventional human observance and medical diagnostics. Exemplary embodiments use computer vision to detect changes in the dog's walk, posture, and other movements over time.

Exemplary embodiments may utilize multiple cameras and other sensory detectors. For example, the spherical ball 40 may have multiple digital cameras that each generate different real-time video data 28, perhaps from different internal/external positions or views. Indeed, because the device 20 may be any wireless video camera, exemplary embodiments may interface with a home or business security system to provide posture and gait analysis. Exemplary embodiments may thus utilize any image sensing technology, such as CMOS, CCD, depth sensor, and stereoscopic vision systems.

Exemplary embodiments, in general, may be applied to health monitoring. The real-time video data 28 may be analyzed to predict any rule-based health condition. For example, real-time video data 28 may be analyzed to estimate or predict a pet's daily caloric consumption and expenditure. That is, exemplary embodiments may compare consumption to physical activity and predict weight gain/loss, constipation, lethargic tendencies, attention disorder, separation anxiety, boredom, and other physical, mental, and psychological issues.

Exemplary embodiments may also be applied to commercial efforts. Large scale husbandry operations may apply exemplary embodiments to cattle, sheep, hog, chicken, and other animals. Exemplary embodiments may monitor a herd of cattle, for example, and predict sick or unhealthy members for isolation or quarantine. Indeed, posture and gait analysis may early predict the onset of some contagious sickness before the larger group or herd is compromised.

Figure 13:
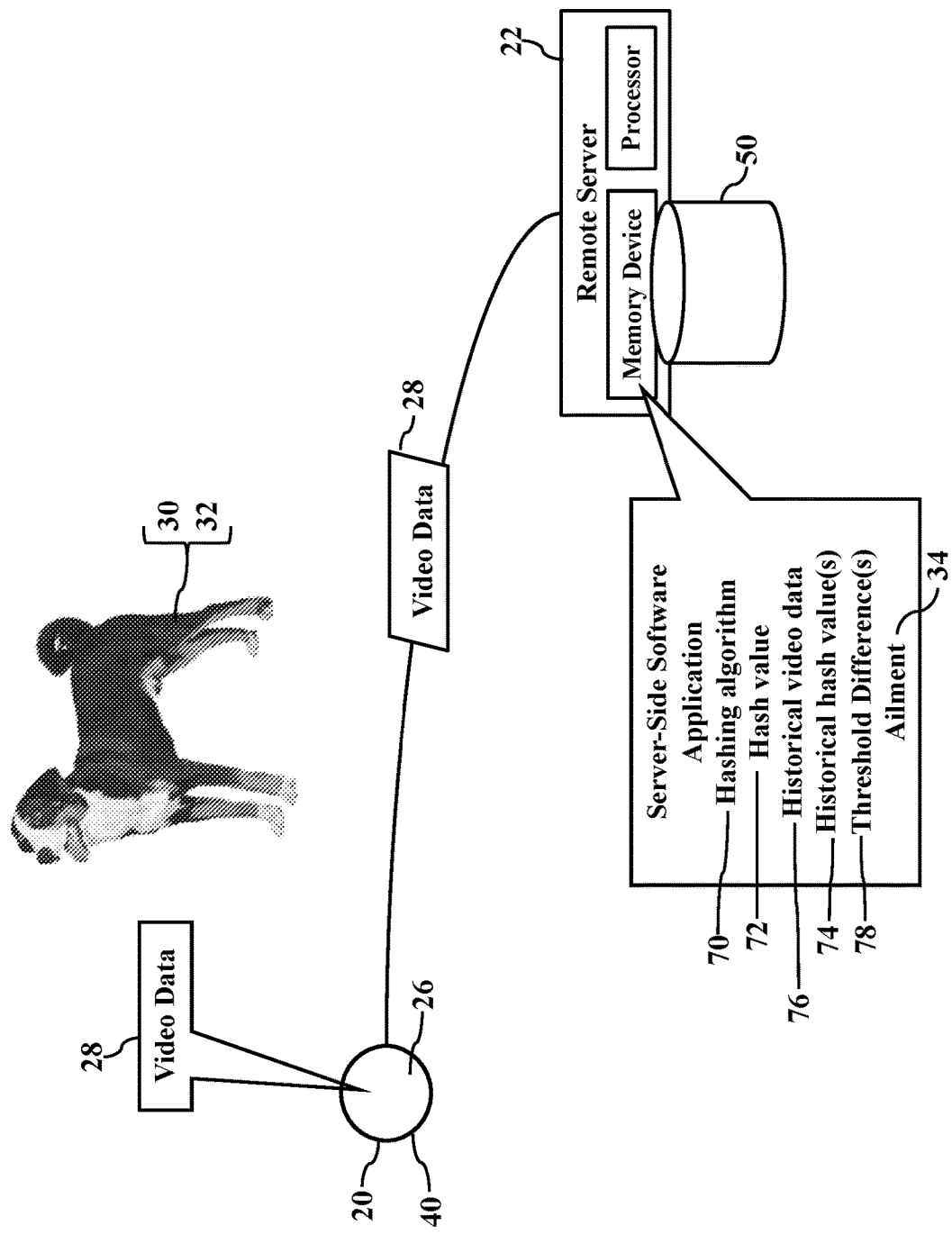
FIGS. 13-14 illustrate a hashing solution, according to exemplary embodiments.
Figure 14:
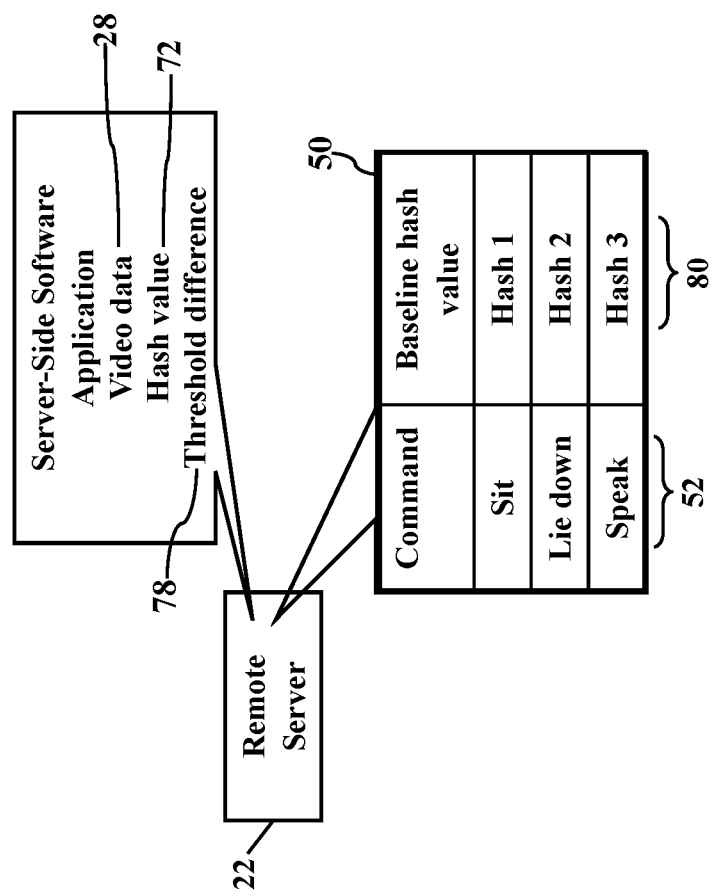

FIGS. 13-14 illustrate a hashing solution, according to exemplary embodiments. When the device 20 (such as the ball 40) captures the video data 28, exemplary embodiments may hash the video data 28 and compare to historical hash values. Suppose, for example, that the remote server 22 receives the real-time video data 28 of the dog 32. While the remote server 22 may analyze all of the video data 28, it is likely that the video data 28 is very large (e.g., gigabytes in size) and contains irrelevant portions (e.g., background furniture and other features). The remote server 22 may therefore process the video data 28 to delete and/or to isolate the most important/relevant frames or portions. The remote server 22 may then apply an electronic representation of a hashing algorithm 70 to the video data 28 to generate one or more hash values 72. While any hashing function may be used, the reader may be familiar with the SHA-256 hashing algorithm. The SHA-256 hashing algorithm acts on any electronic data or information to generate a 256-bit hash value as a cryptographic key. The cryptographic key is thus a unique digital signature representing the video data 28. There are many hashing algorithms, though, and exemplary embodiments may be adapted to any hashing algorithm. Once the hash value 72 is generated, the hash value 72 may be compared to historical hash values 74. That is, the electronic database 50 may store or map the historical hash values 74 representing the historical video data 76. The remote server 22 may hash the historical video data 76 (using the hashing algorithm 70) to generate the historical hash values 74 (perhaps at different times and/or places). The historical hash values 74 may represent past gait, posture, and/or gestural responses. If the current hash value 72 differs from any historical hash value 74 (perhaps according to a permissible threshold difference 78 between the hash values 72 and 74), then the remote server 22 may infer that the dog 32 suffers from the ailment 34.

FIG. 14 further illustrates the electronic database 50. The electronic database 50 may have entries that map, relate, or associate the different audible commands 52 to their corresponding baseline hash values 80. The electronic database 50, for example, associates the audible command 52 "sit!" to the hash value 80 representing the hashed video data for the sitting position. Another entry maps the audible command 52 "lie down!" to its corresponding hash value 80 representing the hashed video data for the lying position. The audible command 52 "speak!" similarly maps to its corresponding hash value 80 representing the hashed video data for the speaking position. While FIG. 14 only illustrates a few examples, in actual practice the electronic database 50 may have many entries for many different audible commands 52 and their many different baseline hash values 80. Any video data of the dog's gestural response to the audible command 52 may be hashed (to generate the hash value 72) and compared to its baseline hash value 80. If the hash values 72 and 80 substantially or favorably compare (perhaps according to the permissible threshold difference 78), then perhaps the dog has correctly responded to the audible command 52. However, if the difference between the hash values 72 and 80 exceeds the permissible threshold difference 78, then the remote server 22 may infer that the dog has incorrectly responded to the audible command 52.

Ailments may be identified. When the hash value 72 differs from the baseline or historical hash value 80, the difference may be related to the ailment 34. As a simple example, suppose a small threshold difference 78 may be related to a change in the gait of the dog. Perhaps a larger threshold difference 78 may be related to a change in the posture of the dog. Another difference (between the hash value 72 and the baseline or historical hash value 80) may indicate a minute injury (such as a cut or thorn in a paw).

Perhaps another difference may indicate an onset of hip degeneration. Indeed, ranges of differences may be associated to stomach ailments, vision problems, and even disease detection (e.g., cancer or organ failure). The electronic database 50 may thus have database entries that associate the different ailments to their corresponding differences between the current hash value 72 and the historical or baseline hash value 80. The electronic database may thus be populated with many differences in hash values that can be identified or mapped to different ailments 34.

Hashing may be locally performed. When the device 20 (such as the ball 40) generates the video data 28, the device-side software application may also call other software programs or modules to hash the video data 28, to compare hash values, and to predict the ailment 34. Moreover, if the electronic database 50 is also locally stored, the device-side software application may query the electronic database 50 for historical or past hash entries, perhaps logged at a similar time of day and/or a similar GPS location. The ball 40 may thus maintain the historical repository of the dog's movements and hash values, determine changes in the hash values over time, and generate the electronic notification 36 of the ailment 34. The device 20 may thus be configured to locally store the one or more logical rules to infer different ailments 34 over time, based on hash values.

The owner's or user's smartphone 38 may also participate. The ball 40 may upload the video data 28 to the smartphone 38 for analysis. Then smartphone's hardware processor executes the mobile software application to hash the video data 28, to compare with the historical hash values 74, and to predict the ailment 34. Moreover, the smartphone 38 may query the electronic database 50 for the historical hash values 74, perhaps logged at a similar time of day and/or a similar GPS location. The mobile smartphone 38 may thus store and/or access the historical repository of the dog's movements, determine change in the hash values over time, and generate the electronic notification 36 of the ailment 34.

Exemplary embodiments may be applied regardless of networking environment. Exemplary embodiments may be easily adapted to stationary or mobile devices having cellular, WI-FP©, near field, and/or BLUETOOTH© capability. Exemplary embodiments may be applied to mobile devices utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the "World Wide Web"), an intranet, a local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

Exemplary embodiments may packetize. The various network interfaces to the communications network 24 may packetize communications or messages into packets of data according to a packet protocol, such as the Internet Protocol. The packets of data contain bits or bytes of data describing the contents, or payload, of a message. A header of each packet of data may contain routing information identifying an origination address and/or a destination address. There are many different known packet protocols, and the Internet Protocol is widely used, so no detailed explanation is needed.

Exemplary embodiments may utilize any processing component, configuration, or system. Any processor could be multiple processors, which could include distributed processors or parallel processors in a single machine or multiple machines. The processor can be used in supporting a virtual processing environment. The processor could include a state machine, application specific integrated circuit (ASIC), programmable gait array (PGA) including a Field PGA, or state machine. When any of the processors execute instructions to perform "operations", this could include the processor performing the operations directly and/or facilitating, directing, or cooperating with another device or component to perform the operations.

Exemplary embodiments may utilize other sensory technologies. Sensors provide information about the surrounding environment and condition. The sensor(s) may include inertial measurement devices, including a 3-axis gyroscope, a 3-axis accelerometer, and a 3-axis magnetometer. According to some embodiments, the sensors provide input to enable processor to maintain awareness of orientation and/or position relative to the initial reference frame after the device initiates movement. In various embodiments, sensors include instruments for detecting light, temperature, humidity, or measuring chemical concentrations or radioactivity. Exemplary embodiments may utilize a GPS receiver that receives GPS signals and infers a current location. The ball's location may thus be stored in the electronic database 50 and mapped or related to the dog's posture, gait, and other data. Exemplary embodiments may thus query the electronic database 50 for a location and identify and even retrieve the dog's corresponding posture and gait.

Exemplary embodiments may have any shape. This disclosure primarily discusses the spherical ball 40, which is thought most simple to understand. However, exemplary embodiments may have other outer shapes, such as multi-faceted soccer or Bucky ball (e.g., hexagons and/or pentagons) for rolling motion. However, exemplary embodiments may also be adapted to any shape capable of rolling and/or spinning. Moreover, exemplary embodiments may also be adapted to radio-controlled aircraft, such as an airplane, helicopter, hovercraft or balloon. Exemplary embodiments may also be adapted to radio controlled watercraft, such as a boat or submarine. Numerous other variations may also be implemented, such as a robot.

Exemplary embodiments may utilize the Internet. As exemplary embodiments establish communication with the communication network, the user may be remotely located far away (such as miles). The user may thus issue speed, direction, and/or the audible commands 52 over the Internet for remote control. Exemplary embodiments may thus interface with a server, web site, or another computing device at a remote location. A networked user may thus remotely control over the Internet. More local control, of course, may be establish using WI-FI, BLUETOOTH, and/or any other IEEE 802 links.

Exemplary embodiments may be physically embodied on or in a processor-readable device or storage medium. For example, exemplary embodiments may include CD-ROM, DVD, tape, cassette, floppy disk, optical disk, memory card, memory drive, and large-capacity disks.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A computer vision system for model-based prediction of an ailment, comprising:
   at least one hardware processor; and
   at least one memory device storing instructions that when executed by the at least one hardware processor perform operations, the operations comprising:
   receiving a video data generated by the computer vision system, the video data representing a subject's physical movement;
   determining an audible command associated with the video data generated by the computer vision system;
   generating a video hash value representing the video data by hashing the video data using an electronic representation of a hash function;
   identifying a historical video hash value by querying an electronic database for the audible command, the electronic database having database entries that associate historical video hash values to audible commands including a database entry of the database entries that associates the audible command to the historical video hash value; and
   cryptographically predicting the ailment by comparing a video hash value difference between the video hash value and the historical video hash value to a threshold value.

2. The system of claim 1, wherein the operations further comprise generating a notification of the ailment.

3. The system of claim 1, wherein the operations further comprise sending a short messaging service text message alerting of the ailment.

4. The system of claim 1, wherein the operations further comprise predicting a gait change in a gait based on the video hash value difference.

5. The system of claim 1, wherein the operations further comprise predicting a posture change in a posture based on the video hash value difference.

6. The system of claim 1, wherein the operations further comprise reproducing the audible command.

7. A method performed by a server providing a cloud-based vision analysis that predicts an ailment based on a video data uploaded via the Internet, comprising:
   receiving, by the server providing the cloud-based vision analysis, the video data sent via the Internet by a client device requesting the cloud-based vision analysis, the video data representing a subject's physical movement;
   determining, by the server providing the cloud-based vision analysis, an audible command associated with the video data;
   generating, by the server providing the cloud-based vision analysis, a video hash value representing the video data by hashing the video data using an electronic representation of a hash function;
   querying, by the server providing the cloud-based vision analysis, an electronic database for the audible command associated with the video data, the electronic database electronically associating historical video hash values to audible commands including the audible command associated with the video data;
   identifying, by the server providing the cloud-based vision analysis, a historical video hash value of the historical video hash values that is electronically associated to the audible command; and
   generating, by the server providing the cloud-based vision analysis, a cryptographic prediction of the ailment by comparing a video hash value difference between the video hash value and the historical video hash value to a threshold value.

8. The method of claim 7, further comprising generating a notification of the ailment.

9. The method of claim 7, further comprising sending a short messaging service text message alerting of the ailment.

10. The method of claim 7, further comprising predicting a change in a gait based on the video hash value difference.

11. The method of claim 7, further comprising predicting a change in a posture based on the video hash value difference.

12. A memory device storing instructions that when executed by a hardware processor perform operations, the operations comprising:
   receiving a video data sent via the Internet from a client device requesting a cloud-based vision analysis;
   determining an audible command associated with the video data sent via the Internet from the client device;
   generating a video hash value representing the video data by hashing the video data using an electronic representation of a hash function;
   querying an electronic database for the audible command associated with the video data sent via the Internet from the client device, the electronic database electronically associating historical video hash values to audible commands including the audible command associated with the video data sent via the Internet from the client device;
   identifying a historical video hash value of the historical video hash values that is electronically associated by the electronic database to the audible command associated with the video data sent via the Internet from the client device;
   comparing the video hash value representing the video data to the historical video hash value that is electronically associated by the electronic database to the audible command;
   determining a hash difference between the video hash value and the historical video hash value that is electronically associated by the electronic database to the audible command;
   generating a cryptographic proof of the ailment by comparing the hash difference to an ailment table having entries that map hash differences to ailments including the hash difference between the video hash value and the historical video hash value;
   identifying the ailment mapped by an entry of the entries in the ailment table to the hash difference between the video hash value and the historical video hash value; and
   sending the ailment via the Internet as a service response to the cloud-based vision analysis.

13. The memory device of claim 12, wherein the operations further comprise generating a notification of the ailment.

14. The memory device of claim 12, wherein the operations further comprise sending a short messaging service text message alerting of the ailment.

15. The memory device of claim 12, wherein the operations further comprise predicting a gait change in a gait based on the hash difference.

16. The memory device of claim 12, wherein the operations further comprise predicting a posture change in a posture based on the hash difference.

17. The memory device of claim 12, wherein the operations further comprise reproducing the audible command.

* * * * *